Sept. 20, 1960     E. C. HUNGATE     2,953,355
AIR CONDITIONING SYSTEMS FOR INDUSTRIAL APPLICATIONS
Filed May 1, 1957     5 Sheets-Sheet 1

INVENTOR.
ERNEST C. HUNGATE.
BY
ATTORNEY.

Sept. 20, 1960  E. C. HUNGATE  2,953,355
AIR CONDITIONING SYSTEMS FOR INDUSTRIAL APPLICATIONS
Filed May 1, 1957  5 Sheets-Sheet 2
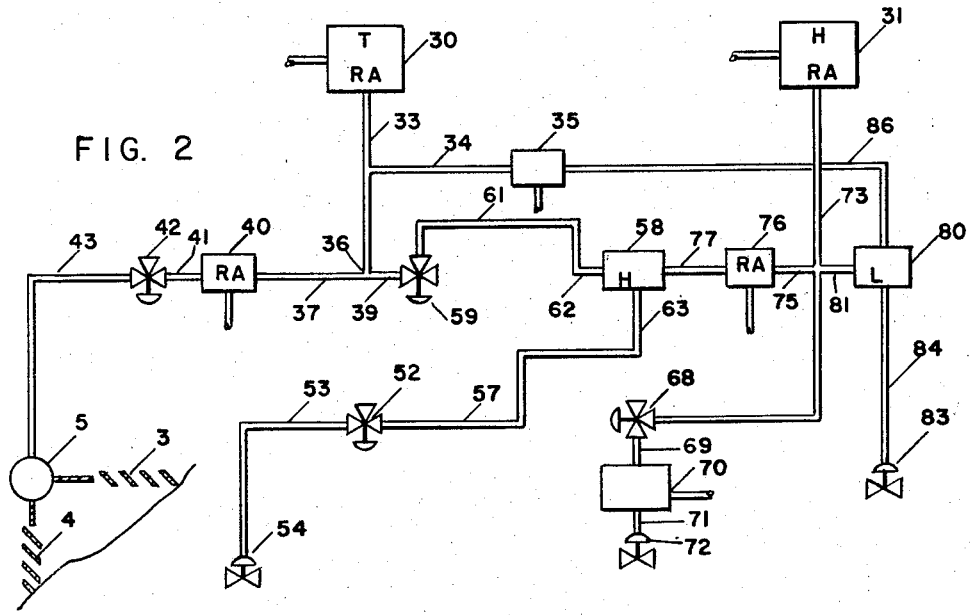
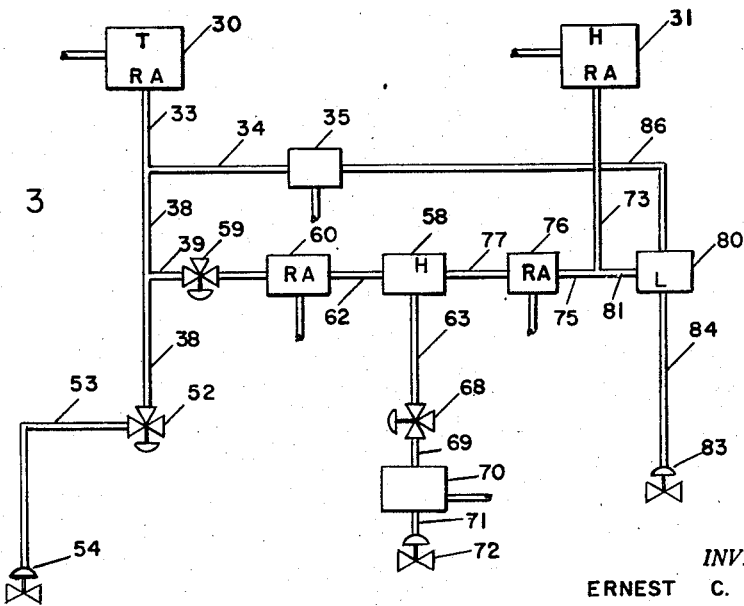
INVENTOR.
ERNEST C. HUNGATE.
BY
ATTORNEY.

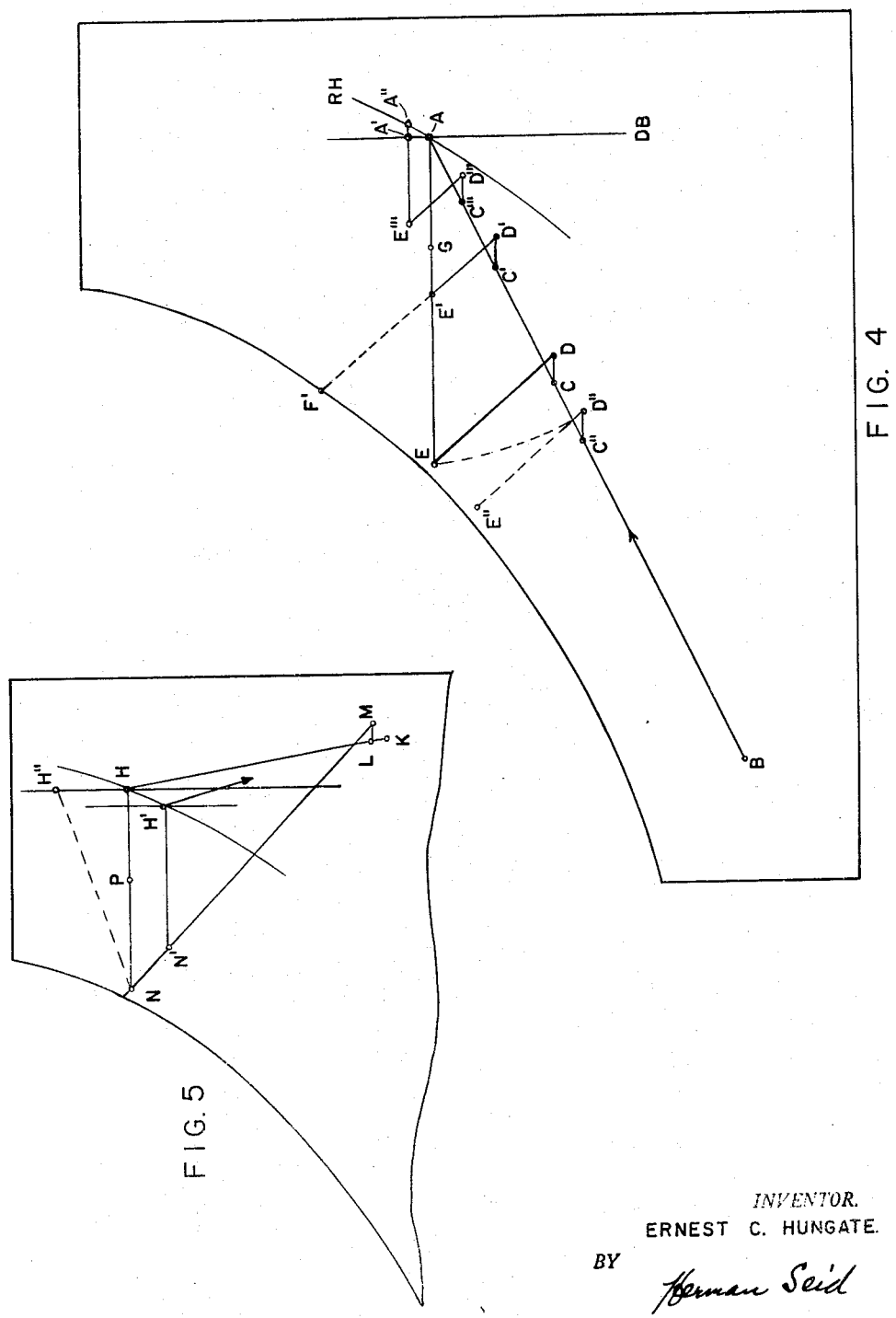

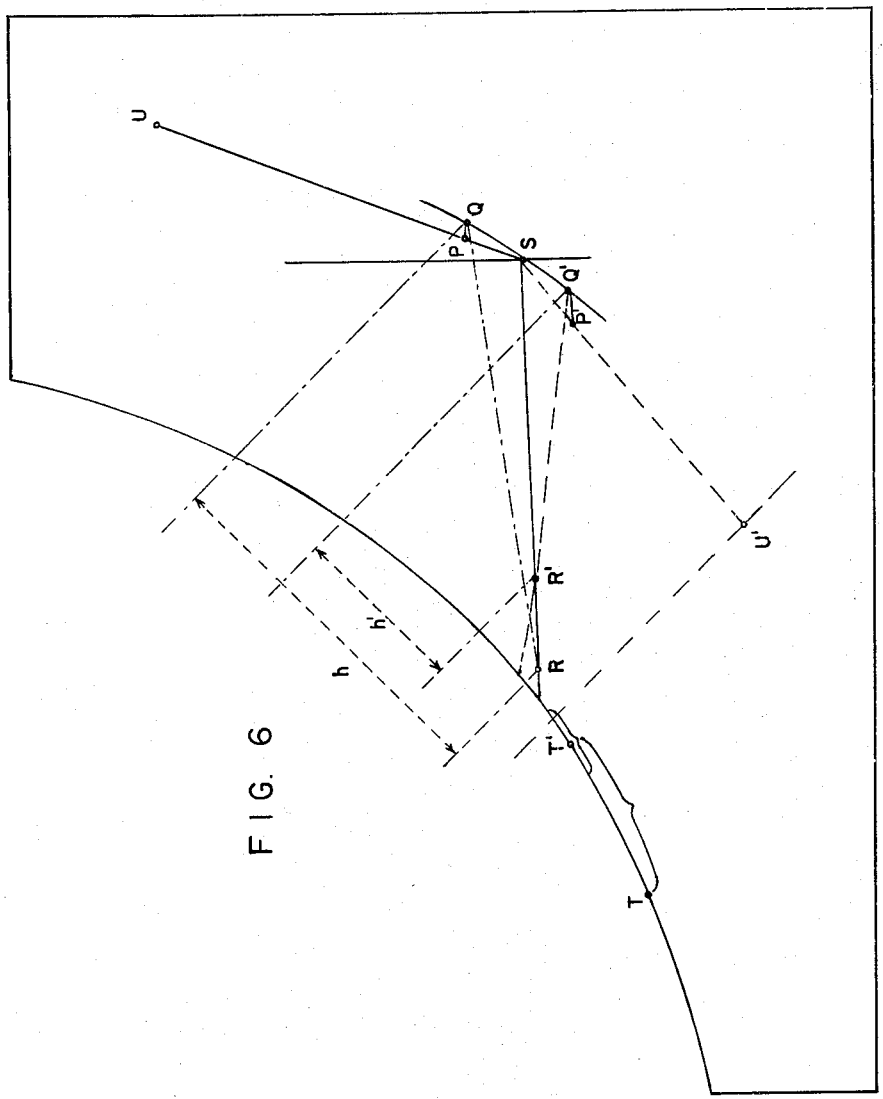

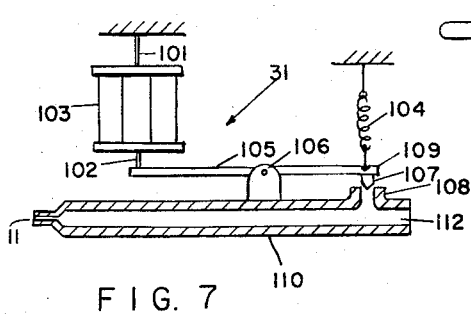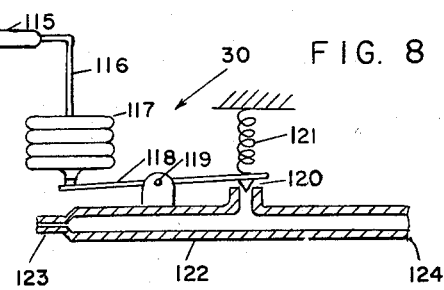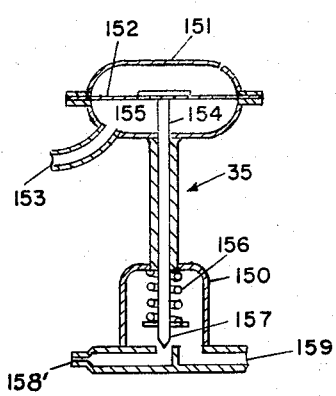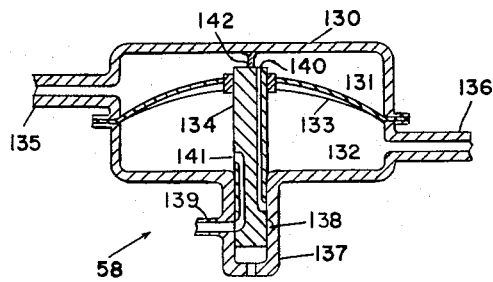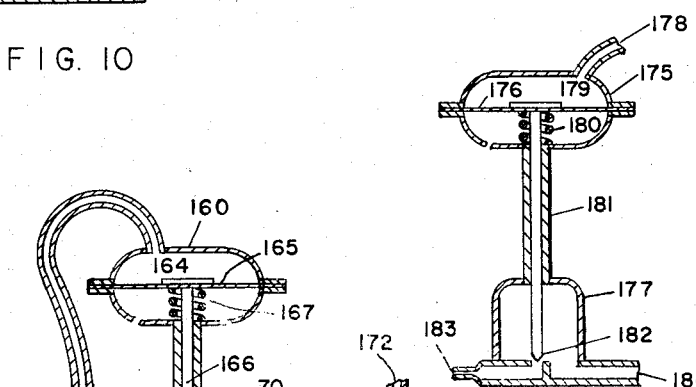

2,953,355

AIR CONDITIONING SYSTEMS FOR INDUSTRIAL APPLICATIONS

Ernest Cornell Hungate, Liverpool, N.Y., assignor to Carrier Corporation, Syracuse, N.Y., a corporation of Delaware Filed May 1, 1957, Ser. No. 656,242

7 Claims. (Cl. 257—281)

This invention relates to air treatment systems embodying control mechanism permitting selective summer and winter operation and more particularly to an air conditioning system for textile mills and similar applications in which the control mechanism is adapted to actuate the system to provide desired conditions of temperature and humidity.

Because of the nature of the operation and the materials fabricated in textile mills, the air conditioning system has a threefold purpose. The first function is to maintain temperature conditions, the second function is to maintain a desired humidity and the third function is to provide necessary ventilation to the mill. Maintenance of proper temperature conditions within the mill, not only assures the comfort of the workers therein, but also prevents any erratic expansion or contraction of the machines and also maintains the uniformity of the materials fabricated. Synthetic fibers especially have been noted to expand as a result of changing temperature conditions. Control of the humidity within the mill is also important, especially in fabricating natural fibers which are greatly affected by humidity conditions. Control of humidity also controls the amount of static electricity created during fabrication with various fibers. Naturally, the need for proper ventilation in a mill is obvious.

To carry out these functions it is common practice to utilize a conditioner such as an air washer. These air washers have not changed basically in the last fifty years and essentially comprise a fan for inducing an air stream through the air washer, nozzles for washing the air by spraying water into the air stream and eliminators for removing entrained liquid particles from the air stream as it leaves the washer. Usually there is also associated with the washer a pump for recirculating the water used in the washer and a filtering system for removing the lint from the water which is recirculated. In certain areas, where evaporative cooling alone will not handle the air conditioning load, suitable water chilling apparatus may be utilized to more adequately condition the mill.

To condition the air, the air is passed through the air washer wherein it is substantially moistened by the spray nozzles therein and the air undergoes adiabatic saturation. Accompanying this heat exchange process is a cleaning process wherein the lint in the air is moistened to the extent that the wet lint particles fall out of the air stream and into the sump of the air washer. A portion of the lint may reach the eliminator blades in the unit at which point a large portion of the wet lint will drain back into the sump of the air washer. However, some of the lint particles will tend to adhere to the surface of the blades, thereby requiring periodic cleaning. To minimize this cleaning and maintenance problem, the spray nozzles within the air washer are maintained at a substantially full capacity throughout the operation to assure that all the air is substantially moistened and a great portion of the lint is removed. With such a mode of operation substantially no air bypass factor exists and all the air is substantially saturated with moisture.

Since the air is substantially always saturated in the air washer, this factor has been utilized as the main control criterion for the air washer system. However, to add flexibility to the system, auxiliary means are utilized with the washer action. These means usually consist of water heating means, air heating means at the exit of the washer or suitable means for mixing the outside and return air introduced into the washer.

The controls normally used in a conventional washer system are a dew point thermostat located at the exit of the washer, a room thermostat and in some cases a room humidistat.

During winter operation of a conventional system, return air and outside air are mixed under the control of a dew point thermostat so that the air passing through the washer will undergo adiabatic saturation resulting in substantially saturated air at a dry bulb temperature as selected by the dew point thermostat. If the dew point thermostat is unable to select a warm enough mixture of air which will result in this wet bulb temperature, it will be assisted by the heating of the spray water to attain the desired supply air condition.

The air at the desired dew point will then be passed into the area to be conditioned and the air temperature will rise usually on a substantially constant absolute humidity line on the psychrometric chart. Should the air conditioning load or the grand total heat within the area to be conditioned be inadequate to raise the air temperature to the desired temperature, the room thermostat within the area will reduce the air quantity entering the area. This can be done to a limited extent after which, if the area is still too cold, the room thermostat will make provision for reheating the air entering the area to be conditioned.

During summer operation if evaporative cooling alone is used, a room humidistat may also be utilized. This humidistat will override the room thermostat to maintain the relative humidity within the area totally disragarding the resulting temperature. Naturally in certain areas the temperature may be so high that evaporative cooling alone is not practical. In such situations refrigerated water is used within the air washer. This refrigerated water is placed under the control of the dew point thermostat which by mixing with recirculated water, preselects the temperature of the spray water used so as to control leaving air conditions.

From the above description it can be readily appreciated that dew point control is inflexible and furthermore from the operational standpoint of the area to be conditioned, in most cases saturation of the air is totally unnecessary. However, from the standpoint of maintaining reasonable cleanliness of the eliminators, saturation of the air is mandatory.

The shortcomings of this type of control are especially evident during summer evaporative cooling. In order to maintain humidity conditions the air is first saturated within the washer to cool the air, then the air is passed into the room and undergoes a temperature rise as it absorbs room sensible heat. As previously noted, the humidistat may under certain circumstances override the room thermostat to maintain the relative humidity. If the area load is less than at peak summer design, this humidistat will cause reheating of the air as it leaves the washer. The system will therefore require heating of the air during summer conditions in order to maintain the relative humidity. Certainly this highlights an outstanding deficiency of dew point control and operation.

The present invention envisions a system which does not require dew point control nor does it require full saturation of the air passing through the washer but rather relies on controlling the system on the basis of temperature and humidity conditions actually existing within the mill. This is possible with the use of air washers of the type disclosed in my copending application Ser. No. 575,560, filed April 2, 1956, wherein a washer is described which may have the spray nozzles therein throttled to a point whereby an 80% air bypass factor may exist without affecting the operating cleanliness of the washer.

The chief object of the present invention is to provide an air washer control system which does not rely for control on dew point conditions.

An object of the invention is to provide a control system which will throttle the water sprays in the washer in response to selected temperature and humidity conditions in the area to be treated.

Another object is to provide a control system wherein the room thermostat will determine the outside air and the return air mixture passing into the washer section.

A still further object is to provide a control system wherein the water heater in the washer is selectively controlled by the humidity and temperature conditions within the area to be conditioned. These and other objects will become more obvious from the following description.

The present invention relates to an air conditioning system for industrial applications having selective summer and winter operation in which water sprays, and steam sprays within the washer and also a reheat coil in the supply duct to the area to be conditioned are regulated by thermostatic and humidity controls within the area being conditioned. These same controls further include means for controlling the blend of outside and return air admitted to the washer. During summer operation, substantially no outside air is admitted to the unit and the room thermostat controls the reheat coil in the duct supplying the area while selectively controlling with the room humidistat the throttling of the spray nozzles within the washer and also selectively controlling the steam sprays with the room humidistat.

During winter operation the room thermostat controls the blend of outside and return air admitted to the washer by adjusting the outside and return air dampers while selectively controlling the air reheat in the supply ducts with the room humidistat and also controlling the steam sprays selectively with the room humidistat, the room humidistat further controlling the operation of the water sprays.

The attached drawings illustrate a preferred embodiment of the invention in which:

Figure 2 is a simplified diagrammatic view operatively indicating the control system during winter and summer evaporative cooling operation;

Figure 3 is a simplified diagrammatic view operatively indicating the system during summer operation with refrigeration;

Figure 4 is a psychrometric diagram indicating the winter operation;

Figure 5 is a psychrometric diagram indicating summer operation with evaporative cooling;

Figure 6 is a psychromatric diagram indicating summer operation utilizing refrigeration;

Figure 7 is a diagrammatic view of a suitable humidistat;

Figure 8 is a diagrammatic view of a suitable thermostat;

Figure 9 is a diagrammatic view of a suitable duplex cumulator;

Figure 10 is a diagrammatic view of a suitable proportional ratio pressure relay;

Figure 11 is a diagrammatic view of a suitable minimum branch pressure relay; and Figure 12 is a diagrammatic view of a suitable reverse action relay.

Figure 1:
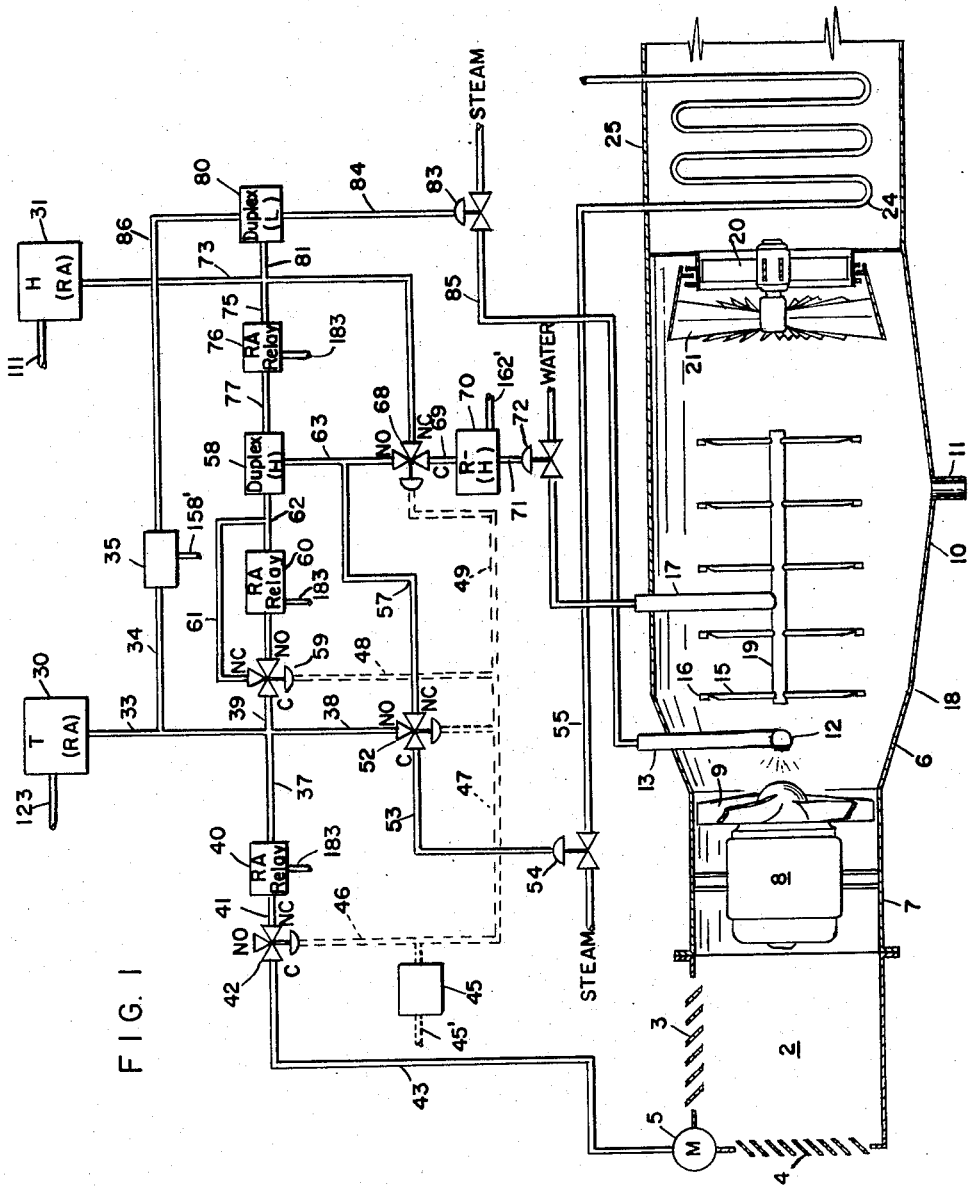
Figure 1 is a diagrammatic view of the invention illustrating the control system as applied to a conditioner of the type disclosed in my copending application referred to above.

Referring to Figure 1 there is shown an air washer employing the controls comprising the present invention. Air first passes into a mixing chamber 2 which has return air dampers 3 and outside air dampers 4. These dampers are controlled by a motor 5. If desired a motor for each damper may be used. This motor 5 is pneumatically controlled by suitable controls to be described hereinafter. The operation of these dampers is such that a proportional opening in one damper will result in a proportional closing in the other damper so that if the return damper 3 is open, the outside air damper 4 will be substantially closed and vice versa.

The mixing chamber 2 is connected to the air washer 6 which may be of the type described in my copending application Ser. No. 575,560, filed April 2, 1956. This washer comprises a cylindrical section 7 which has concentrically mounted therein a motor driven fan 9.

Following this fan section there is the washer section which comprises a casing 18 having extending therein a pipe 13 having spray openings 12. This line 13 is connected to a suitable source of steam to be described more fully hereinafter. The steam sprays 12 are located adjacent the fan 9 and are followed by the spray section of the washer. The spray section includes a pipe 19 connected to a source of spray water by means of the line 17. A plurality of banks of branch lines 15 extend from this pipe 19 and at the end of each branch there is located a spray nozzle 16. In lower portion of the casing 18 there is located a sump 10 with a suitable drain 11 for removing water from the unit.

Following the banks of spray nozzles 16 there is located a rotatable eliminator 20 which is journaled in the bearing 21. The construction of this rotatable eliminator is similar to that shown in my aforementioned copending application which in essence comprises a hub having extending therefrom a plurality of blades comprising a plurality of surfaces intersecting in a plane or in a conical surface, the outer periphery of the eliminator having enclosing means which have suitable sealing means associated therewith to prevent any bypass around the eliminator structure.

Following the eliminator and the washer proper, there is a section of duct 25 which extends to the areas to be treated by the washer. Located in this duct is a suitable heating coil 24 connected to a suitable supply of steam or other heating medium.

Considering the operation of the washer, air is mixed in suitable quantities by means of the dampers 3 and 4 in response to controls to be described. The air is induced into the washer from the mixing chamber 2 by the fan 9. The air passing into the washer first encounters the steam sprays 12 whose function it is to increase the dew point and also the weight of moisture in the air depending upon desired conditions. This may also be accomplished by heating the spray water. Following the steam sprays there are located the various banks of nozzles 16 which are attached to the spray water control. Air which has been drawn into the washer is suitably moistened and may be put in a saturated condition if desired. In this type of washer it is possible to throttle the water to a point where a substantially 80% bypass is possible. Heretofore this has not been possible because of the severe clogging of the eliminator structure. However, with the eliminator structure as set forth in my copending application, the washer has a character wherein it is substantially self-cleaning and can remain in operation for periods of more than a year without any major maintenance or cleaning operations to be performed thereon. The moistened air which passes the spray nozzles encounters the eliminator 20.

This eliminator substantially removes all of the lint and liquid droplets from the air leaving the air washer and returns the moisture and lint to the sump 10 from whence it is passed into a suitable filtering system and then returned to the spray headers. After the air has passed from the washer structure, it is passed into the duct 25. If the air conditioning load in the area to be conditioned is not sufficient to decrease the humidity to a desired point or increase the temperature to a suitable temperature, this condition may be remedied by the suitable application of heat by means of the steam coil 24 in response to the control arrangement of the present invention.

At this point there has been described a suitable washer which may be used with the present invention. Other washers may be used if it is possible to suitably throttle the spray water during operation without having lint accumulations impeding the operation of the machine. Heretofore, this has not been possible because the conventional stationary eliminator structure utilized merely comprised a plurality of stationary blades defining a plurality of changes in direction therein so as to remove any liquid or lint particles from the air by an impingement process. It will be noted that this washer has suitable means for controlling the condition of the air passing into the area to be conditioned, the first control being the ability to mix outside air and return air in suitable quantities to reach a suitable mixture temperature. Second, there is the utilization of steam sprays to suitably control the apparatus dew point. This is followed by a water spray system which may be suitably modulated between 0 and 80% bypass factor. To add to the versatility of the system, suitable reheat coils 24 are utilized in the ducts. By suitable manipulation of these four means the desired temperature, humidity and cleanliness within the area to be conditioned, may be maintained.

To control these four means, a control system with two responsive elements is utilized. A thermostat 30 and a humidistat 31 are the responsive elements and they are placed in the area or room to be conditioned; preferably for close control, they may be placed in a suitable aspirator cabinet (not shown). Service air is supplied to the humidistat 31 through the line 111 and to the thermostat 30 through line 123.

The present control system is pneumatically actuated and consists of a plurality of valves which are normally open to determine a summer operating pattern and have means responsive to air pressure for determining a second operational pattern for winter. These particular patterns will be more fully illustrated in a description of Figures 2 and 3.

Studying Figure 1 it will be noted that a plurality of reverse action relays are used in series. Naturally two reverse action relays in series have a nullifying result. This practice has been found to be necessary from the standpoint of providing a changeover system designed for two different methods of operation. The operation of these relays is such that if a given pressure is introduced into the relay a pressure equal to the maximum operating air pressure minus the given pressure will pass from the relay. For example, the maximum pressure may be 15 p.s.i., introducing a 3 p.s.i. pressure to a reverse action relay results in 12 p.s.i. passing from the relay. A suitable construction for a reverse action relay is shown in Figure 12. It will be noted that service air pressure is utilized in the operation of these relays through the opening 183.

Referring to Figure 1, extending from the thermostat 30 is line 33 from which extends the line 34 having therein the pressure ratio regulator 35. The function of this pressure ratio regulator is to suitably change in a predetermined proportion the air pressure acting on one side thereof. A full description of a suitable construction for the relay 35 is given in Figure 10. A source of high pressure service air is admitted through line 158' to relay 35. The line 33 is also connected to the lines 37, 38 and 39. The line 37 extends to the reverse action relay 40.

The operation of this reverse action relay will be such that if a pressure of 3 p.s.i. is exerted, in the line 37 a pressure of 15 p.s.i. minus 3 or 12 p.s.i. will be maintained in the line 41 in the manner previously indicated. In the line 41 there is a valve 42 which is of the 3-way pneumatically operated type. This valve, as can be seen from the schematic drawing has three ports, a common port (c) which is always open and which is connected by means of the line 43 to the damper motor 5 which controls the return air and outside air dampers 3 and 4.

The valve 42 also has a normally open (no) port which in this particular case vents the common port (c) to the atmosphere. There is a third port indicated as normally closed (nc) which under certain circumstances is open. In this particular situation when a pressure of 15 p.s.i. is exerted on the motor element of the valve, the normally closed (nc) and the common ports (c) are connected in the valve thereby permitting the pressure in the line 41 to pass through the line 43 into the damper motor 5 and in this way control the mixture of air entering the washer 6. To control the valve 42 a suitable pneumatic system is provided with a changeover switch 45. This changeover switch is connected to a suitable supply of air 45'. In this particular case 15 p.s.i. air is used; however it is readily appreciated, other pressures may be used.

This changeover valve during summer operation is closed and no pressure is exerted on the motor members of the various 3-way valves, thereby maintaining the normally open (no) and the common (c) ports connected. During winter operation however, the changeover switch provides 15 p.s.i. air pressure to act on the operating elements of the various 3-way valves causing the normally closed (nc) and the common (c) ports to be connected. The various valves in the system are connected by the lines 46, 47, 48 and 49 to the changeover switch. The summer and winter circuits will be simplified by the description of Figures 2 and 3. Considering the circuit as outlined at this point, it will be noted that the thermostat by means of the reverse action relay will cause a predetermined air pressure to act on the damper motor 5 during winter operation. During summer operation the damper motor will be disconnected from the control system and the damper setup in the mixing chamber is such that the return air damper will open fully and the outside air damper will be closed.

The thermostat 30 by means of the lines 33 and 38 is also connected to the valve 52. This connection is to the normally open (no) port of the valve which is a 3-way control valve. The common port (c) of the valve by means of the line 53 is connected to the steam reheat valve 54. By applying pressure to the control element of valve 54 steam is permitted to pass through the line 55 to the reheat coil 24 in the duct 25. This valve 54 is normally biased in a closed position and opens when a minimum air pressure is applied to the motor element of the valve.

The normally closed port of the valve 52 is connected by means of a line 57 to the duplex cumulator 58 in a manner to be described hereinafter.

The thermostat 30 by means of lines 33 and 39 is connected to the valve 59 and this connection is to the common port (c) of the valve. The normally open (no) port of this valve is connected to the reverse action relay 60 which is similar to the previously mentioned reverse action relay 40. The valve 59 by means of the normally closed (nc) connection of the valve and by means of the line 61 bypasses the reverse relay 60 and connects into the line 62 which extends between the reverse action relay 60 and the duplex cumulator 58.

The duplex cumulator is a pneumatic instrument which responds to either a low or a high pressure being introduced into the cumulator, as may be desired. In operation, two pressures are transmitted to the device, if the device is set for a high condition, the higher pressure only will be passed through the device. In certain instances it is desirable that the lower pressure be passed through the device and this device may be so adjusted. The duplex cumulator 58 in the present invention is set for a high condition. In other words, only the high pressure introduced to the cumulator will be passed therethrough. This pressure is passed through the line 63 and depending upon circumstances may pass through the line 57 through the valve 52 and line 53 to control the valve 54 which controls the reheat steam.

The line 63 extends to the normally open (*no*) port in the valve 68. The common (*c*) opening of this valve is connected by means of the line 69 to the minimum pressure relay 70. This relay 70 functions in a manner wherein only pressures above a certain minimum value are permitted to pass therethrough and this relay is in turn connected to the valve 72 by means of the line 71. Service air is supplied to the relay 70 through the line 162'. The valve 72 throttles the water supply to the spray nozzles 16 in the washer 6.

The room humidistat 31 has a reverse acting relay which is connected by means of the line 73 to the normally closed (*nc*) port of the valve 68. Depending upon seasonal conditions and whether pressure exists in the line 49, this will determine whether the common (*c*) port of this valve 68 is connected to the normally closed (*nc*) or normally open (*no*) port of the valve.

The reverse action relay 76 is also connected to the room humidistat 31 by means of the lines 73 and 75. This reverse action relay is in turn connected by means of the line 77 to the duplex cumulator 58. It can be seen that the spray nozzles are controlled by means of the valve 72 which may be controlled either by the room thermostat 30 or the room humidistat 31 depending upon seasonal conditions.

A second duplex cumulator 80 is operatively associated with the room humidistat 31 by means of the lines 73 and 81. This duplex cumulator 80 is set for a low condition which determines that the lower pressure which is introduced to the instrument will pass therethrough and will be able to control the valve 83. The valve 83 controls the introduction of steam through the line 85, ultimately connected through the steam sprays 12. The duplex cumulator 80 is also connected by means of the line 86 to the proportional pressure ratio relay 35 which is in turn connected to the thermostat 30. By means of this setup the steam spray valve 83 is mainly under the control of the room humidistat 31. However, in certain conditions when thermostatic conditions are such as to be extremely severe, the lower pressure will be sent by the reverse action relay of the thermostat 30 to the proportional ratio relay 35, which in turn will transmit a pressure double the value of the control pressure introduced thereto to the duplex cumulator 80. Even after this increase in pressure from the relay 35, this pressure will be the lower pressure introduced to the duplex cumulator. The room thermostat 30 will control the steam sprays 12 by means of the valve 83. This control will manifest itself normally by not opening the valve since a pressure of a predetermined magnitude is required to open the valve. Since the lower pressure introduced to the duplex cumulator will be passed to the valve, the valve is rarely open.

Referring to Figure 2, there is shown a simplified diagram of the over-all control system shown in Figure 1. Figure 2 relates to a system wherein the system is operating under winter conditions or under summer conditions utilizing evaporative cooling only. To arrive at Figure 2 in an operative sense, the changeover switch 45 shown in Figure 1 applies air pressure to the valves 42, 52, 59 and 68. By applying this pressure, the normally closed (*nc*) and the common (*c*) ports of these valves are connected and the normally open (*no*) port of these valves is made inoperative.

It will be noted from Figure 2 that the room thermostat is connected by means of lines 33 and 37, reverse action relay 40, line 41, valve 42 and line 43 to the damper motor 5. During winter operation the thermostat will function to apportion the amounts of outside and return air admitted to the washer shown in Figure 1. During summer operation utilizing evaporative cooling, the outside air dampers are wide open and only a small amount of leakage return air is passed to the air washer. This will be shown hereinafter with the psychrometric descriptions of the present invention.

The room thermostat is also connected by means of the lines 33 and 34, proportional ratio relay 35 and line 86 to the duplex cumulator 80 which is operatively associated with the spray heater valve 83 in the fashion previously mentioned. The room thermostat is also connected by means of the lines 36 and 39, valve 59 and line 61 to the duplex cumulator 58 which, during winter operation is operatively connected to the reheat steam valve 54 by means of the lines 63 and 57, valve 52 and line 53. Simultaneously the room humidistat 31 is connected by means of the lines 73 and 75, reverse action relay 76 and line 77 to the duplex cumulator 58 which also in conjunction with the room thermostat controls the reheat steam valve 54.

The room humidistat is also connected to the duplex cumulator 80 by means of the lines 73 and 81 and this humidistat is further connected to the throttling spray water valve 72 by means of line 73, valve 68, line 69, relay 70 and line 71.

Considering Figure 2, it will be noted that the room thermostat controls the outside and return air dampers and also the reheat valve 54 through the duplex cumulator 58. However, it will be also noted that the room humidistat by means of the reverse action relay 76 has control over this reheat valve 54 because as the humidity increases the reverse action relay of the humidistat plus the reverse action of the relay 76 will cause a high pressure to be introduced to the duplex cumulator 58 which could be higher than the action of the thermostat 30, which as temperature conditions increase will merely transmit a lower pressure and therefore a secondary pressure to the duplex cumulator 58.

The thermostat 30 also plays a secondary function in limiting the action of the spray heater valve 83 because of the proportional ratio pressure relay 35.

The room humidistat 31 not only controls the reheat steam valve 54 by means of the duplex cumulator 58 but also plays an important function in controlling the duplex cumulator 80 which controls the spray heater valve 83. However, the primary function of the humidistat is to control the spray throttle valve 72.

Figure 3 is a simplified diagrammatic drawing of the control system shown by Figure 1 under summer operation using refrigerated water in the spray nozzles. During summer operation the mixing dampers are oriented so that the outside air damper is substantially closed and merely a small amount of outside air leaks through the damper and is present in the air introduced into the air washer. The diagram of Figure 3 is a result of the operation of the changeover switch 45 shown in Figure 1. Under summer operation, control switch 45 does not introduce any air into the control valves 42, 52, 59 and 68. Therefore these valves are in a position wherein the common (*c*) port and the normally open (*no*) port of the valve are connected and the normally closed port is inoperative. This orientation of valve elements operatively results in the diagram of Figure 3.

The room thermostat 30 is connected by means of the lines 33 and 38, valve 52 and line 53 to the reheat valve 54. Simultaneously the thermostat 30 is connected by means of lines 33, 38 and 39, valve 59, reverse action relay 60 and line 62 to the duplex cumulator 58 which in turn is connected by means of the line 63, valve 68, line 69, relay 70 and line 71 to the valve 72 which is the spray throttling valve for the washer. The duplex cumulator 80 is also operatively associated with the thermostat 30 by means of lines 33 and 34, relay 35 and line 86. As previously indicated, this duplex cumulator responds to the lower pressure introduced to the instrument to control the spray heater valve 83 through the line 84. The room humidistat 31 is connected to the duplex cumulator 58 by means of the lines 73 and 75, reverse action relay 76 and line 77. The humidistat is also connected to the duplex cumulator 80 by means of lines 73 and 81.

In this diagram during summer operation with refrigerated water being used, the room thermostat at lower temperatures will introduce heat by means of opening the reheat steam valve 54. Also when the temperature in the area being conditioned rises, there will be a tendency to control the duplex cumulator 58 to increase the spray quantity by means of further opening the valve 72. The room humidistat 31 will with an increase in humidity tend to operate the spray throttle valve 72 through the duplex cumulator 58 in which case the action of the thermostat 30 on the cumulator is overcome. Simultaneously this room humidistat will also control the duplex cumulator 80 with the room thermostat 30 playing a secondary role, however, being able to override the action of the room humidistat depending upon the conditions and the setting of the proportional ratio relay 35.

In considering the operation of Figure 1 more fully Figures 7–12 are provided to give an indication of the nature of the instruments utilized in the control diagrams. Figure 7 is a diagrammatic view of a humidistat which may be used in the present invention. This particular type of humidistat requires a supply of service air (15 p.s.i. in the case of control of Figure 1). The humidistat comprises a connection to a source of air to be admitted at the restricted opening 111, a needle valve 108 and a connection to the control system through the opening 112. Controlling the valve member 107 is a lever 105 pivoted at point 106. The needle valve member 107 is biased in an open position by the tension spring 104. The opposite end of the lever 105 is restrained by the links 101 and 102 connected by the humidity sensing element 103. Normally this sensing element comprises two members connected by a hygroscopic material such as strands of human hair or pieces of wood. With an increase of humidity the human hair will expand permitting the spring 104 to bias the needle valve to an open position, thereby bleeding the service air to a lesser pressure. It will be apparent that humidistats of different constructions may be used. However, it is important that the amount of air pressure passing through the opening 112 to the control system diminish with increases in humidity within the mill.

Figure 8 illustrates a diagrammatic view of a thermostat which may be used in the present invention. This thermostat comprises a sensing bulb 115 containing a thermo-expanding liquid or gas, which, with increases of temperature, expands through the line 116 to inflate the bellows motor 117. This bellows motor pivots the lever 118 about the point 119. At the end of the lever is a needle valve 120 which is normally biased in a closed position by the compression spring 121. During operation service air is introduced through the restricted opening 123 of the valve member 122. With increases in temperature the needle valve 120 will open, bleeding the air supply therein and sending a greatly diminished air pressure through the opening 124 to the remainder of the control system.

Figure 9 is a diagrammatic view of a duplex cumulator indicated as 58 in Figure 1. This device comprises flanged valve body 130 having two chambers 131 and 132 separated by a flexible diaphragm 133. Suitable air inlets 135 and 136 are provided to these chambers. Operatively associated with the diaphragm is a valve member 134 which reciprocates within the valve body 137. This valve body has an annular space 138 which is connected to the cumulator discharge 139. The valve member 134 has two passages 140 and 141. These passages are so oriented that in a first position as illustrated in Figure 9, chamber 132 is in communication with the opening 139. This first condition occurs when the air pressure introduced through the opening 136 is greater than the pressure existing in chamber 131. As the air enters chamber 132 this higher pressure is permitted to pass into the remainder of the control system. An abutment 142 is provided to determine the first position of the valve member 134.

If the pressure introduced through the opening 135 increases within the chamber 131 to a value greater than the pressure within the chamber 132, the diaphragm 133 will be deflected downwardly moving the valve member 134 toward a second position, wherein the discharge 139 of the device will be put into communication with the chamber 131 by means of the passage 140. When this occurs no air will pass from the chamber 132 because the exit port from the passage 141 will be closed. From the above description is apparent that the greater pressure exiting in either chamber 131 or 132 will determine the position of the valve member 134 and ultimately the source of air passing to the discharge 139.

It will be readily appreciated that a duplex cumulator responsive to the lower pressure introduced to the device such as indicated as device 80 in Figure 1, may be adapted from a similar construction as Figure 9, however, the passages 140 and 141 are placed so that the lower pressure chamber will be placed in communication with the discharge 139.

Considering a possible construction for the proportional ratio pressure relay 35 in Figure 1, Figure 10 diagrammatically illustrates a construction which comprises a valve 150 under the influence of a damper motor 151. A control pressure is passed into the device through the line 153. This pressure is passed into the chamber 155 wherein is located a diaphragm 152. The air pressure therein urges the diaphragm upwardly carrying therewith the valve stem 154. By suitably selecting an opposing biasing spring 156 and a suitable needle valve 157 a proportional ratio pressure may be passed through the valve member. Since the pressure introduced to the line 153 may reach as high as 15 p.s.i., in the event that a two to one proportional increase is desired, 30 p.s.i. should be introduced to the opening 158. Because of the nature of the spring 156 and the nature of the needle valve 157 a pressure twice the value of the pressure introduced into the opening 153 will pass from the valve opening 159 to the remainder of the control system in the circuit.

Referring to Figure 11 there is illustrated a construction for a minimum branch pressure relay. This device performs the function of supplying a minimum pressure regardless of the control pressure transmitted to the instrument. Service air pressure is supplied through the restricted opening 162. A portion of this air passes through the line 163 into the diaphragm motor 160. This air is introduced into the chamber 164, wherein is located the diaphragm 165. This diaphragm is connected to the valve stem 166 which is operatively associated with the needle valve 168 located within the valve body 161. Opposing the air pressure within the chamber 164 is a spring member 167 which biases the needle valve 168 in an open position. By this construction a control air pressure is always supplied to the check valve 170.

Air pressure is introduced through the opening 162 which tends to close the needle valve 168, thereby limiting the air introduced into the check valve. As this pressure decreases, the effect of the spring 167 is to open the needle valve 168 thereby decreasing the throttling of the air supply to this valve. By this construction the pressure introduced to the check valve is regulated. This regulated air pressure is permitted to pass to the line 169 which is connected to the control system. Also connected to this line 169 is the line 172 which is associated with the remainder of the control system. Located in this line 172 is the check valve 171.

During normal operation air will pass through the line 172 through the check valve 171 and through the line 169 to the remainder of the control system. In the event that this pressure in the line 172 diminishes to a value less than the value of the regulated air pressure supplied to the value 170, the regulated air pressure will open check valve 170 and close the valve 171 thereby maintaining a condition wherein an air pressure less than the regulated pressure never exists within the line 169. As will be appreciated from the operation of this device, the spray water throttling valve 72 will always be opened to an extent determined by this minimum regulated pressure.

Figure 12 illustrates a diagrammatic view for a possible construction for the reverse action relays utilized in Figure 1. The basic valve construction of Figure 10 is again utilized. This device as in the case of the humidistat, thermostat and proportional ratio pressure relay requires service air pressure. This service air pressure is introduced through the restricted opening 183 and is suitably controlled by the valve section 177 by means of the needle valve 182. In this device the control air pressure is introduced through the line 178 into the chamber 179 of the diaphragm motor 175. This air pressure will tend to deflect the diaphragm in a downward direction. Opposing this action is the spring member 180 which is located beneath the diaphragm 176. As can be seen the air pressure introduced into the chamber 179 will tend to urge the stem 181 downwardly closing the needle valve 182. When no air pressure is supplied, the spring 180 biases the valve in an open position. As can be appreciated this construction permits a greater air pressure to pass through the opening 184 to the remainder of the control system when a smaller air pressure is introduced through the line 178 into the diaphragm motor 175, thereby indicating the reverse action of this air pressure relay.

It will be appreciated that other constructions of control devices may be utilized without extending beyond the scope of the present invention.

Considering the operation of the present invention, there is shown in Figure 4 a psychrometric chart illustrating the operation of the present control during winter operating conditions. A desired room condition is shown at A, which defines a room at a specific relative humidity and a specific dry bulb temperature. As a starting point assume that the room requires full sensible cooling capacity. In this case the room thermostat will position the outside and return air dampers 3 and 4 to provide a mixture entering the fan at condition C, that is, air at the temperature A which is return air and outside air at the temperature B combine to give a mixture of air at condition C. This position is necessary to provide the wet bulb temperature required for full room sensible load. As the air passes through the supply fan 9, it is sensibly heated from condition C to condition D. This process occurs on a constant moisture line. At condition D the air enters the spray chamber of the washer and is substantially saturated adiabatically toward the saturation curve and leaves at the condition E. This condition is substantially at the dew point of the air; however, it does not quite reach the saturation line because of the 95% effectiveness of most washers which always have a small amount of bypass. The air is then passed into the room rising from condition E to condition A, which is a constant moisture line, and in effect illustrates the load handled by the unit in taking care of the space to be conditioned.

In the event that the room cooling requirements diminish as is usual during winter operation since the air conditioning load is less, and full capacity is available as shown by the line EA, the room will become cooler. As the temperature drops, the room thermostat would feel a reduction in temperature and reposition the outside and return dampers to admit less outside air. The mixture condition of the return air at condition A and outside air at condition B will then be repositioned to the point C′ and the addition of fan heat will place conditions at D′. The air will then be saturated adiabatically to condition E′ at which condition the air will be permitted to pass into the area and the load would be defined by the lines E′ and A.

To accomplish this naturally the action of the washer must be modified. It is apparent that if the air is passed through the washer it would normally pass up to the vicinity of the dew point for that particular adiabatic saturation line which would be at point F′. However, the room humidistat 31 as viewed in Figure 2 will cause the valve 72 to throttle slightly so as to cause a higher by pass factor in the washer thereby determining that the air will leave the washer at the condition E′.

Naturally, should the load again diminish, the room thermostat 30 could continue to change the mixture of outside and return air until only the 5% leakage would occur and also at the same time the room humidistat would continue to throttle the sprays until an 80% bypass factor would be reached, at which point no further throttling could be allowed because the resulting washing action wuld be inadequate and would result in lint accumulations within the structure, because of the poor wetting of the lint in the air stream passing therethrough.

Under certain circumstances the throttling of the water sprays should not be permitted to reach the 80% bypass factor and also in many situations it is desirable to take a substantial amount of outside air rather than to recirculate the return air. Under such circumstances the air will go through a cycle from C′ to D′ to E′. However, the amount of cooling load will only be between the points E′ and G. Naturally the point G is at a higher relative humidity and a lower dry bulb temperature than is desirable, this would cause the room thermostat 30 shown in Figure 2 to manifest itself through the duplex cumulator 58 to operate the valve 54 resulting in the passage of steam into the coils 24. This action, in effect, causes the addition of heat to the air prior to passage into the area to be conditioned. The air changes from condition E′ to condition G on Figure 4. The load in the mill then takes the air from condition G to condition A.

Again there is a possibility that under certain circumstances the mixture of outside and return air can only be held to condition C″ and with the addition of fan heat the air will reach condition D″. An adiabatic saturation at this point would result in reaching condition E″. Naturally from this view it is obvious that a very low dew point is reached which will never permit reaching the point A with sensible heating of the air. In order to rectify this situation the room humidistat 31 operating through the duplex cumulator 80 opens the valve 83 which permits steam to pass through the steam sprays 12 which are shown in Figure 1 and this causes the air to deviate from an adiabatic process, and change from the condition D″ to the condition E and from condition E to condition A which is the desirable room condition. Again, if the load in the room is inadequate to absorb all of this cooling effect, it is possible for the reheat valve 54 to open under the influence of the thermostat 30 operating through the duplex cumulator 58 and prevent a drop in room temperature.

Consider week-end conditions wherein the outside air and return air have been limited to a condition C‴. With the addition of fan heat the air changes to condition D‴, adiabatic saturation takes place to condition E‴ which is the minimum throttle position permissible under the existing load conditions to maintain the minimum operational cleanliness of the washer; the room condition changes to point A′ which is at the correct dry bulb temperature, however, at much too high humidity. Under such circumstances the room humidistat operating through the duplex cumulator 58 shown in Figure 2, will admit steam to the re-heat coil 24 by means of opening the valve 54. This will bring the temperature and humidity conditions of the air to condition A″, which, it will be noted, is the correct relative humidity; however, at a too high dry bulb temperature. At this point, the room thermostat recognizes this condition and promptly readjusts the outside and return air mixture to resulting condition C‴ closer to condition C′ causing the line E‴ A″ to overlap with the line EA. The humidistat and thermostat will then continue to cooperate to maintain the desired condition of point A.

Reviewing the previous action, it will be noted that the operation of the return and outside air dampers 3 and 4 resulted because of the action of the thermostat 30 which, it will be noted from this diagram, can also operate through the duplex cumulator 58; however, under the aforementioned conditions, the humidistat 31 had overridden the duplex cumulator and had taken over control to the exclusion of the thermostat 30. Obviously, the operation shown does not take place in steps. The two instruments function together; that is, the room humidistat and thermostat constantly attempt to maintain the desired room conditions.

The use of the spray heater interlock as indicated by the duplex cumulator 80 comes into play under unusual conditions designed to prevent the system from attempting to meet conditions in an unrealistic manner, as for example, during start-up conditions when the system initially has insufficient air capacity to handle the load within the area to be conditioned. Under these conditions the unit will attempt to attain the greatest air rise, that is, from E to A on the psychrometric diagram in Figure 4. Accordingly, the outside air damper and return air damper will adjust to reach the condition C on the diagram. Under these conditions, the unit will give a relative humidity lower than desirable; however, the sprays will be on full. The natural expedient for the control would be to increase the humidity by putting the steam sprays on full in order to raise the humidity. However, since the system is short of capacity, this is highly undesirable because the steam would introduce unnecessary heat to the system. With this condition, the duplex cumulator 80 will come under the influence of the room thermostat 30, overriding the humidistat 31, and prevent the steam spray from coming on when the dry bulb temperature in the room is above the set point. The system will therefore pull down to the desired dry bulb temperature before steam can be admitted to raise humidity to the desired point.

It is believed that the versatility of the system during winter operation as illustrated by Figure 2 has been sufficiently demonstrated by the various modes of operation shown in Figure 4. It will be appreciated that by use of a washer of the type shown in my copending application, throttling of the water sprays adds new flexibility and economy to a washer system. Heretofore, washer systems have been tied down to the dew point thermostat control. This dew point thermostat would first control the dampers for the outside and return air and if this was insufficient, they would meet conditions by heating the spray water. A room thermostat would volume the air or throttle the amount of air passed to the area to be conditioned, which is certainly a condition which is undesirable since it, in effect, cuts down the capacity of the unit and varies room relative humidity. If the air reduction is inadequate to meet conditions the room thermostat would call for steam in the reheat coils.

Consider the psychrometrics of a conventional washer system by referring to Figure 4. The dew point thermostat regulates the mixture of return and outside air so that the washer will adiabatically saturate the air from condition D to condition E. The point E is the important point since the washer relies on substantially full saturation. Point A is at the desired temperature and relative humidity for the area to be conditioned. Should the load decrease so that the cooling load between G and A is only necessary, the system is forced to apply reheat and heat the air from condition E to condition G. Naturally, this is undesirable, since when a cooling load is desired, in certain instances, we are placing a heating system against a cooling load which, as illustrated by the present system is not necessary if the mixture of outside and return air is set to run up the adiabatic saturation line D′ to E′ and then to the point A precisely meeting room or mill conditions.

From the above comparison of the new system with the conventional system, it is apparent that the new system does not have to saturate to the dew point and may have a considerable bypass factor which enables the system to operate under fractional loads which normally in conventional systems require reheat. Obviously, if the load within an area is very small, on its face it would appear to be very inefficient to make up for this lack of load by utilizing steam also resulting in making the room hotter than necessary. Furthermore, dew point control is unrealistic since it does not take into consideration the actual room conditions as the direct basis of control. The present system, by not being tied down to dew point control considers temperature and humidity and adjusts the washer accordingly.

Referring to Figure 5, there is shown a consideration of the psychrometric cycle of summer operation of an all air evaporative cooling system. During this type of operation, the control scheme of Figure 2 is still maintained. Under full load summer operation, the room dry bulb with evaporative cooling would obviously be above that desired in winter. Since the dry bulb is high, the room thermostat will call for maximum outside air, which with the 5% return air leakage will amount to 95% outside air in the mixture.

The small quantity of return air at condition H mixes with the large quantity of outside air at condition K resulting in a mixture at L and with the addition of fan heat, condition M results. At the condition M, the air is adiabatically saturated toward the apparatus dew point and leaves the conditioner at condition N. Again, it will be noted that the saturation efficiency of the unit is never 100% but normally in the vicinity of 95% and the point N is not on the saturation line but rather adjacent thereto. The air leaves the unit at condition N and rises to the condition H absorbing sensible heat. Under this condition, all of the room control is under the influence of the room humidistat since the thermostat is at the end of its sequence having turned reheat off fully and having opened outside air dampers to their maximum setting.

To explain the control operation more fully, assume that the outside air wet bulb temperature has remained the same but the room sensible load for some reason has been reduced. As this condition occurs, the room dry bulb would begin to drop and the relative humidity would tend to rise. The humidistat, in feeling an increase in relative humidity, would throttle the spray valve to produce a large bypass factor and the air would leave at condition N′. It would then change to the condition H′ maintaining room humidity at a lower and more comfortable dry bulb temperature. The thermostat would not reposition the damper since although the dry bulb is lower, it is still far above the minimum desired temperature.

Although from this psychrometric cycle no spray heater is used, there are conditions where it might cause difficulty. Again, the duplex cumulator 80 and the pressure ratio relay 35 would prevent any misoperation. As an example, if this system did not have enough air capacity to hold the room humidity, the humidistat, after putting on full sprays would turn on the steam spray heater. Obviously, this would not be desirable, since the temperature would become too high. Under such a circumstance, the control interlock, namely the relay 35 and the duplex cumulator 80, would not permit the steam spray to come on due to the fact that the room dry bulb is above 80° or any other set point. This condition could also occur if the system was started up after shut down and the conditions were hot and dry. Again the room thermostat would override the humidistat control because of the great discrepancy in temperature conditions as compared to humidity conditions in the system.

Considering the operation of a conventional system wherein there is no throttling of the spray water, it will be appreciated that a process of adiabatic saturation would occur from the point M to the point N shown in Figure 5. In the event that the load of the area would diminish so that the rise between conditions N and P would be required, it will be appreciated that at the point P the room humidity would be much too high for proper operation of the system. To compensate for this condition the reheat steam valve in the system would heat the air being admitted to the area to be conditioned so as to bring the humidity conditions of the air at P to condition H which is the desired operating humidity for the area. Naturally, reheat is undesirable in view of the fact that during summer when cooling is desired, because of the partial load, steam is needed to maintain the proper humidity in the area to be conditioned.

Compare this condition with that illustrated in Figure 5 wherein the bypass factor of the washer is increased so that the air leaves the washer at point N' and passes to condition H' resulting in a proper humidity control accompanied by a much lower dry bulb temperature, which is naturally more comfortable for the persons working within the mill.

Clearly, the approach wherein a dew point thermostat controls the system is highly inefficient since at certain portions of summer operation, reheat steam may be required during the portion of the year when certainly cooling is a major problem. In addition to the aforementioned disadvantage, the steam will cause the dry bulb temperature to rise to a point which may be very uncomfortable to those working within the mill, whereas the improved system would not only obviate the need for reheat steam but also provide a lower dry bulb operating temperature.

Considering the operation of a system employing refrigeration during the summer, the changeover switch 45 in Figure 1 is turned to summer operation wherein no air pressure is supplied to the motor elements of the valves 42, 52, 59 and 68. This operation changes the control circuit from that illustrated in Figure 2 to that illustrated in Figure 3. It will be noted in Figure 3 that the duplex cumulator 58 now controls the spray quantity instead of the previously controlled reheat steam, and the thermostat controls the reheat valve exclusively. It will also be appreciated that during summer operation a minimum amount of outside air is taken in and the dampers are set in a position wherein the outside air dampers are closed and the return air dampers are fully open and only outside air leakage passes to the washer which perhaps in most instances would amount to about 5% of the air passing through the washer.

During summer operation with refrigeration, refrigerated water is supplied to the washer at a constant temperature as maintained by the refrigeration machine controls. In order to make changes for load reduction, the spray nozzles are throttled by the duplex cumulator 58 which controls the spray throttling valve 72. In conventional systems, since there can be no throttling of the total water, cold water is mixed with warmer water in a controlled proportion to maintain the desired mixture temperature and the normal cycle takes place wherein the air is substantially saturated prior to being passed into the area being conditioned.

Referring to Figure 6 chilled water is introduced into the unit at temperature T which is shown on the dew point line of the psychrometric chart. This water rises up along the dew point line until it reaches temperature T' at which point it leaves the unit. This rise in temperature naturally is accompanied by a reduction in temperature and moisture content of the air passing through the washer. Considering full summer load, a small amount of outside air at temperature U enters the unit and mixes with a much larger quantity of return air at room temperature S providing a mixture shown on the diagram at condition P. This air passing over the fan motor has its temperature increased to condition Q. As the air passes through the air washer the temperature is pulled down to the condition R which is adjacent the saturation curve. The air at the temperature R is then introduced into the room and absorbs the load therein maintaining the temperature and humidity of the air to condition S. The room humidistat throttles the chilled water quantity to maintain a leaving dew point which will satisfy room humidity at the desired temperature. Under this design condition no reheat will be required since the rise from R to S is of a capacity necessary to hold room conditions under peak summer loads.

Consider another situation wherein a partial load condition exists and where the outside air is at a changeover wet bulb condition U'. The mixture of return air at condition S and outside air at condition U' results in a mixture at condition P'. As the air passes over the fan motor the temperature rises to Q'. The air then passes through the air washer and, as a result of the sprays controlled by the duplex action of the thermostat 30 and the room humidistat 31 shown in Figure 3, the air is suitably cooled and humidified to the point R'. However, to reach this point, the spray nozzles have been suitably throttled providing a bypass factor which results in the condition R' which is not a saturated air condition.

To illustrate the differences in loads, during full load conditions a total heat requirement illustrated as $h$ is shown to be the change in enthalpy in the air as it passes through the unit. With partial load conditions the distance $h'$ represents the new total heat requirement indicating a much smaller load.

As the load continues to decrease, the room humidistat will sense a decrease in humidity and cause reduction of spray quantity, thereby matching the total heat abstraction of the water to that required of the air.

Naturally, in certain situations the cooling requirements may become very low and again we must remember that the bypass factor should not normally exceed 80% in this type of washer to maintain adequate washing. If limited by this condition, or by a winter cooling load, the room thermostat will take over in such a way as to put on the reheat valve 54, thereby introducing heat into the steam coil 24 in the duct 25 thereby making up for the lack of load in the mill. In other situations the room humidistat will apply the steam sprays to satisfy conditions.

In considering the operation of the aforementioned controls illustrated in Figure 3 under summer conditions with refrigeration, it will be remembered that in maintaining the conditions within the area the room humidistat has been mainly considered, however, it is possible as can be seen from the diagram in Figure 3 that there will be joint control of the spray nozzles by means of the duplex cumulator 58 wherein the humidistat works jointly with the room thermostat to control the operation of this particular part of the system.

Reconsidering the operation during summer, basically the room thermostat and the room humidistat will control the water sprays together. In the event that the thermostat after having been overridden by the room humidistat, cannot effect satisfactory conditions, the reheat valve will be open in an attempt to satisfy conditions. In the event the room humidistat is overridden by the room thermostat, and cannot prevent the apparatus dew point and room relative humidity from falling by spray throttling, it will then open the steam sprays to an extent necessary to satisfy conditions by introducing steam into the air passing through the unit. Here again, if thermostatic conditions are so drastically different, the thermostat 30 has an opportunity to override this humidistat control by the connection to the duplex cumulator 80 by way of the relay 35 much in the manner as previously described.

In comparing the present system with conventional systems although in certain rare instances the present system may require reheat steam to satisfy partial load conditions, it can be safely said that this steam requirement is much lower than that used in conventional systems using straight reheat and wherein the air leaving the washer is always near a saturated condition as illustrated in Figure 6. Furthermore, the circulated air quantity remains constant, and more even and exact room conditions can be maintained.

From the above description it is believed that a system has been illustrated, which is not dependent on dew point control and is vastly more satisfactory in that it gives more precise room control, more efficiently and without excessive requirements for reheat. Further ramifications of the present system are also evident as for example, in certain situations where the room conditions require high humidity. Rather than increase the air side of the system drastically, it is desirable to use constant discharge water atomizers in the area and the atomizers are not cycled off and on as with conventional systems, thereby preventing changes in relative humidity. In such an application the control system would not change from that illustrated in Figures 1, 2 and 3. The psychrometrics would vary slightly since instead of rising in the room at a substantially constant moisture content, the air would, because of the atomizing action have its water quantity constantly rising at a steeper sensible heat factor. This may be illustrated in Figure 5. The air after having been substantially saturated from the condition M to condition N in an adiabatic line will, instead of passing from condition N to condition H, rather pass up to condition H", which is of the same dry bulb temperature as H, however, the relative humidity is somewhat higher due to the admission and evaporation of atomized water in the space. As can be seen by this application, a unit of smaller air capacity may be utilized; however, with the added evaporative cooling of the atomizers in the room, the cooling capacity of the entire system is greatly supplemented.

Other arrangements are also within the scope of the present invention, for example, multiple washers may be used in parallel with a common source of recirculated water and also utilizing a common filter system for removing lint particles from the units. The control system would not vary and the individual psychrometrics of each washer depending upon conditions in the various areas, would be functioning in a similar manner as shown in the psychrometric drawings illustrated in Figures 4, 5 and 6.

While I have described a preferred embodiment of my invention, it will be understood that my invention is not limited thereto since it may be otherwise embodied within the scope of the following claims.

I claim:

1. In an air conditioning system for industrial applications having selective summer and winter operation wherein the air conditioning system includes an air washer, means for mixing return and outside air, means for heating air passing into the air washer, means for spraying water into the air as it passes through the washer and means for heating the air passing from the air washer; a control arrangement comprising a thermostat and a humidistat located in the area to be treated, means for controlling the mixture of return and outside air, means for throttling the water supplied to the water spray means in the air washer, means for controlling the heating of the air passing to the air washer, means for controlling the heating of the air passing from the air washer, change-over means to determine first and second operating relationships between the thermostat, humidistat and the last four mentioned means; said first relationship comprising said means for controlling the mixture of return and outside air being regulated by the thermostat, said means for controlling the heating of the air passing from the air washer being regulated selectively by the humidistat and the thermostat, said means for throttling the water sprays into the air as it passes through the air washer being regulated by the humidistat, said means for controlling the heating of the air passing to the air washer being regulated selectively by the humidistat and the thermostat; and the second relationship comprising said means for controlling the heating of the air passing from the air washer being regulated by the thermostat, said means for throttling the water spray into the air stream passing through the air washer being regulated selectively by the thermostat and the humidistat, said means for controlling the heating of the air passing to the air washer being regulated selectively by the humidistat and the thermostat.

2. In an air conditioning system for textile mills, the combination of an air washer including means for spraying water into the air as it passes through the air washer, a rotary eliminator for removing lint and droplets of water from the air passing from the washer, means for passing a stream of air through the air washer, means for heating air passing to the sprays of the air washer, means for heating the air passing from the air washer; and a control arrangement comprising a temperature sensing element located in the area to be treated; a humidity sensing element located in the area to be treated; means for varying the quantity of water supplied to the water spray means in the air washer, means for actuating the varying means; first means for controlling the heating of the air passing to the sprays of the air washer; second means for controlling the heating of the air passing from the air washer; a control element operatively associated with the temperature sensing element and the humidity sensing element and selectively operable responsive to conditions reflected by the temperature sensing element and the humidity sensing element to select the temperature sensing element or the humidity sensing element to regulate said actuating means to vary the quantity of water sprayed into the air; said first heating means being regulated by the humidity sensing element and the temperature sensing element, and said second heating means being regulated by the temperature sensing element.

3. An air conditioning system for textile mills according to claim 2 in which a control element is operatively associated with the temperature sensing element and the humidity sensing element and selectively operable responsive to conditions reflected by the temperature sensing element and the humidity sensing element to regulate the means for controlling the heating of the air passing to the sprays of the air washer.

4. In an air conditioning system for textile mills, the combination of an air washer including means for spraying water into the air as it passes through the air washer, a rotary eliminator for removing lint and droplets of water from the air passing from the washer, means for passing a stream of air through the air washer, means for heating air passing to the sprays of the air washer, means for heating the air passing from the air washer, and a control arrangement comprising a temperature sensing element located in the area to be treated, a humidity sensing element located in the area to be treated, means for varying the quantity of the water supplied to the water spray means in the air washer, said varying means being regulated by the humidity sensing element and the temperature sensing element, means for controlling the heating of the air passing to the sprays of the air washer, a control element operatively associated with the temperature sensing element and the humidity sensing element and selectively operable responsive to conditions reflected by the temperature sensing element and the humidity sensing element to regulate said means for controlling the heating of the air passing to the sprays of the air washer, and means for controlling the heating of the air passing from the air washer, said means for controlling the heating of the air passing from the air washer being regulated by the temperature sensing element.

5. In an air conditioning system for textile mills, the combination of an air washer including means for spraying water into the air as it passes through the air washer, a rotary eliminator for removing lint and droplets of water from the air passing from the washer, means for passing a stream of air through the air washer, means for mixing return air and outside air to be passed to the sprays of the air washer, all return air directed to the washer passing through the sprays thereof, means for heating air passing to the sprays of the air washer, means for heating the air passing from the air washer, and a control arrangement comprising a temperature sensing element located in the area to be treated, a humidity sensing element located in the area to be treated, means for controlling the mixture of return air and outside air, means for varying the quantity of water supplied to the water spray means in the air washer including a valve, means for actuating said valve, a first control element operatively associated with the temperature sensing element and the humidity sensing element and selectively operable responsive to conditions reflected by the temperature sensing element and the humidity sensing element to select the temperature sensing element or the humidity sensing element to regulate said actuating means to vary the quantity of water sprayed into the air, means for controlling the heating of the air passing to the sprays of the air washer including a valve, a second control element connected to the valve and operatively associated with the temperature sensing element and the humidity sensing element and selectively operable responsive to conditions reflected by the temperature sensing element and the humidity sensing element to regulate said heating valve, and means for controlling the heating of the air passing from the air washer, said means being capable of actuation by the first control element and by the temperature sensing element.

6. An air conditioning system for textile mills according to claim 5 in which the control arrangement includes change-over means to determine first and second operating relationships between the temperature sensing element, the humidity sensing element, the air mixing means, the water varying means, the means for controlling the heating of the air passing to the sprays of the air washer and the means for controlling the heating of the air passing from the air washer; the first relationship comprising the air mixing means being actuated by the temperature sensing element, the water varying means being regulated by the humidity sensing means, the means for controlling the heating of the air passing to the sprays being regulated by the temperature sensing element and the humidity sensing element, and the means for controlling the heating of the air passing from the air washer being regulated by the humidity sensing element and the temperature sensing element; the second relationship including the air mixing means being rendered inoperable in a position to supply substantially all return air to the sprays, the water varying means being regulated by the humidity sensing means and the temperature sensing means, the means for controlling the heating of the air passing to the sprays being regulated by the humidity sensing element and the temperature sensing element, and the means for controlling the heating of the air passing from the air washer being regulated by the temperature sensing element.

7. In the method of air conditioning a textile mill, the steps which consist in forming an air stream from a mixture of return air and outside air, spraying a desired quantity of water into the air stream, heating the mixture prior to its passage to the sprays, and heating the mixture after its passage through the sprays, while under summer operating conditions varying the quantity of water sprayed into the air stream selectively in response to temperature and humidity conditions in the area being treated, regulating the heating of the mixture prior to its passage to the sprays selectively in response to temperature and humidity conditions in the area being treated, regulating the heating of the air stream after its passage through the sprays in response to temperature conditions within the area being treated, and forming the air stream substantially from a stream of return air from the area being treated; while, under winter operating conditions, regulating the proportions of the mixed air stream in response to temperature conditions existing within the area being treated, varying the quantity of water sprayed into the air stream in response to humidity conditions in the area being treated, regulating the heating of the mixture prior to its passage to the sprays selectively in response to temperature and humidity conditions in the area being treated, and regulating the heating of the air stream after its passage through the sprays selectively in response to temperature and humidity conditions within the area being treated.

References Cited in the file of this patent

UNITED STATES PATENTS

| | | |
|---|---|---|
| 2,177,596 | Haines | Oct. 24, 1939 |
| 2,315,517 | Greenlee et al. | Apr. 6, 1943 |
| 2,338,382 | Marlow | Jan. 4, 1944 |
| 2,445,121 | Ney | July 13, 1948 |
| 2,872,858 | Caldwell | Feb. 10, 1959 |

UNITED STATES PATENT OFFICE

CERTIFICATE OF CORRECTION

Patent No. 2,953,355 September 20, 1960

Ernest Cornell Hungate

It is hereby certified that error appears in the printed specification of the above numbered patent requiring correction and that the said Letters Patent should read as corrected below.

Column 7, line 4, for "high", second occurrence, read -- higher --; column 10, line 20, for "exiting" read -- existing --; column 12, line 24, for "wuld" read -- would --.

Signed and sealed this 25th day of April 1961.

(SEAL)
Attest:

ERNEST W. SWIDER
Attesting Officer

DAVID L. LADD
Commissioner of Patents